United States Patent Office 3,077,378
Patented Feb. 12, 1963

3,077,378
SEPARATION OF EUROPIUM FROM OTHER LANTHANIDE RARE EARTHS BY SOLVENT EXTRACTION
Donald F. Peppard, Oak Park, Earl P. Horwitz, Park Forest, and George W. Mason, Clarendon Hills, Ill., assignors to the United States of America as represented by the United States Atomic Energy Commission
No Drawing. Filed July 14, 1961, Ser. No. 124,238
20 Claims. (Cl. 23—23)

This invention deals with the separation and recovery of europium values from a solution containing them together with other lanthanide rare earths.

Europium and other lanthanides occur in monazite sand and in neutron-irradiated uranium, in the latter as fission products. For many applications it is of great importance to have the europium in a high degree of purity. This is the case, for instance, when it is to be employed as control material in nuclear reactors for which it is useful on account of its high neutron-capture cross section and also because a series of isotopes of a high neutron-capture cross section is formed consecutively by neutron capture, $Eu^{151}$, $Eu^{152}$, $Eu^{153}$ and $Eu^{154}$ all having a relatively high neutron-capture cross section. For a similar reason it is of importance to remove the europium when the neutron-bombarded fuel is processed for regeneration, because the high-cross-section isotopes "poison" the fuel.

Various methods have been used heretofore for the isolation of europium. The europium, which practically always is present in the trivalent state, has been reduced by means of a mercury cathode or zinc amalgam and has then been precipitated as europium (II) sulfate or chloride. Another method investigated heretofore is the direct reduction of europium (III) with sodium amalgam or by electrolysis at a mercury or lithium amalgam cathode to form europium amalgam. Also, the reduction of trivalent europium to the divalent state with zinc powder followed by the precipitation of the trivalent lanthanides as the hydroxides with a concentrated ammonia solution has been investigated.

These methods, however, were found not to be satisfactory, because they did not bring about a complete separation of the trivalent rare earths from divalent europium or vice versa. Most likely this incomplete separation was due to a nonquantitative reduction of the europium. Divalent europium is very unstable, especially when it is present in a low concentration; there always remains some trivalent europium which follows the trivalent rare earths in the customary separation processes.

It is an object of this invention to provide a process for the separation of europium from aqueous solutions also containing other lanthanide rare earths, which is satisfactorily operative for micro- as well as macro-concentrations of europium.

It is another object of this invention to provide a process for the separation of europium from aqueous solutions which is especially advantageous for solutions containing the europium in tracer concentrations.

It is another object of this invention to provide a process for the separation of europium from aqueous solutions which is especially advantageous for solutions containing the europium in macroconcentrations and other rare earths in drastically predominant quantities.

It is still another object of this invention to provide a process for the separation of europium from aqueous rare earths solutions by which the europium is recovered in a high degree of purity.

It was found that europium can be selectively held in the divalent state, without there taking place a reduction of any of the other lanthanide rare earths present, including samarium or ytterbium, by forming in the solution to be treated divalent chromium and then extracting the nonreduced rare earths into a water-immiscible solvent away from the divalent europium. According to this invention the divalent chromium is formed in situ by reducing a compound of trivalent chromium, such as chromic chloride, with zinc amalgam. The trivalent chromium and the zinc amalgam cooperate very effectively and bring about the quantitative reduction of the trivalent europium. Zinc amalgam alone does not bring about this desired result and in particular not in a solution containing microquantities of europium or else containing other rare earths in drastically predominant quantities. Likewise, divalent chromium ions alone did not perform satisfactorily; they did reduce the europium but at such a slow rate that the process was entirely impractical.

The extraction can be either made from an aqueous solution by selective extraction, of the trivalent rare earths away from the reduced europium, into a solvent, or the separation can be carried out from an organic solution by first reducing the europium in said organic solution and then back-extracting it with an aqueous mineral acid solution away from the trivalent rare earths.

The process of this invention comprises adding zinc amalgam to a solution containing europium and other lanthanide rare earth metal values, the feed solution; flushing the solution and the atmosphere in contact with the solution with an inert gas, such as nitrogen, to remove practically all of the oxygen; adding trivalent chromium ions to the solution; contacting the solution with an extractant, said extractant being an organic solution of phosphoric or phosphonic acid ester in the case of an aqueous feed and an aqueous mineral acid solution in the case of an organic feed, whereby both europium and chromium are reduced to the divalent state; and separating an organic rare-earth-containing phase from an aqueous europium-containing phase.

Since both liquids, the ester solution and the aqueous acid, are thoroughly contacted during the extraction step, the reducing agent need be added to one of the two liquids only. The trivalent chromium compound is added preferably in a quantity to yield a concentration of from 0.001 to 0.01 M. The zinc has to be present in an excess quantity, that is, in a quantity greater than that stoichiometrically required for the reduction of the europium. The composition of the zinc amalgam may vary widely; however, a mercury content of about 0.5% by weight was the preferred content. It is advantageously added in the form of a powder, say of a particle size of about 30 mesh, but this is only optional. Both, the aqueous and organic solution, should be flushed with nitrogen or other inert gas to avoid as much as possible any reoxidation of europium.

All mineral acids that have no oxidizing effect on the europium are suitable for the process of this invention. Therefore nitric acid cannot be used, but sulfuric and hydrochloric acids have performed satisfactorily. The acidity has to be chosen so that a good separation effect is obtained. This has to be determined on the basis of the rare earth concentrations and on the interrelationship between rare-earth and europium extractions and the acidity at the given concentration; with decreasing acidity both rare-earth extraction and europium (II) extraction are improved, however at a different rate.

As the extractant either acidic esters of orthophosphoric acid, (HO)(HO)PO(OH), wherein two of the hydroxy groups are substituted by alkyl, aryl or mixed alkyl-aryl radicals or substituted variants of these radicals, can be used for the extraction process of this invention, or else half-esters of organo-phosphonic acids are suitable, which are phosphoric acids in which the hydrogen atom only of one hydroxy group is replaced by an organic group G' and another hydroxy group has been replaced totally by an organic radical or group G, the third hydroxy group remaining unchanged. Thus the formula for the acidic esters would be $(RO)_2PO(OH)$, where R indicates the alkyl, aryl or alkyl-aryl radical, including substituted variants, and the formula for the half-esters of the organophosphonic acid would be $$(G'O)(G)(PO)(OH)$$

The radicals R, G and G' should have at least four carbon atoms each to obtain a compound that has the high water immiscibility necessary for solvent extraction processes. The radical found best for G' is 2-ethyl hexyl and those preferred for G are 2-ethyl hexyl, monochloromethyl (hereinafter simply referred to as chloromethyl) and phenyl. Solvents that proved particularly effective in the recovery of europium are di(2-ethyl hexyl) orthophosphoric acid, $(2\text{-ethyl hexyl O})_2PO(OH)$, 2-ethyl hexyl hydrogen phenyl phosphonic acid, $(2\text{-ethyl hexyl O})(C_6H_5)PO(OH)$, and n-octyl hydrogen chloromethyl phosphonic acid, $(\text{n-octyl O})(ClCH_2)PO(OH)$; from these, the n-octyl hydrogen chloromethyl phosphonic acid is the best.

The esters intended for the extraction process of this invention have a relatively high viscosity and are therefore used in diluted form so that phase separation is faster and easier. Carbon tetrachloride and aromatic water-immiscible hydrocarbons are suitable for this purpose. Examples of the many satisfactory hydrocarbon carrier diluents are toluene, benzene and xylene, toluene being the preferred one, because it has a relatively high vaporization point and is not a mixture of different isomers.

The concentration of the ester in the carrier diluent may vary widely; the lower the concentration of the extractant is in the carrier diluent, the lesser are the amounts of europium and other rare earths extracted into the organic phase. Here again the conditions have to be chosen so that the distribution ratio of the trivalent rare earths is above unity and that of divalent europium is below unity. A concentration of between 0.01 and 1.5 F was found to be satisfactory for all extractants. ("F" is a symbol to indicate formality, which means that one liter of a 1 F solution of extractant contains as many grams of the extractant as the formula of the extractant indicates, disregarding any polymerization or dissociation that may take place.) Also, the volume ratio of organic and aqueous solution may vary widely; for instance, it may range from 20:1 to 1:20. The preferred extraction temperature is room temperature, which is approximately 25° C.

The process of this invention can be carried out as a batch process where contact of the two phases is preferably intensified by agitation or shaking, or it can be carried out in a continuous operation in extraction columns or other similar apparatus where the aqueous and the organic solutions are passed countercurrently. After the contact for extraction, the phases are always allowed to settle and separate, which takes from two to five minutes. Thereafter, the phases are separated by methods and means known to those skilled in the art.

After the extraction and phase separation, the solutions can be further processed for the recovery of the rare earths. Thus, the organic ester solution can be contacted with an aqueous mineral acid for the back-extraction of the rare earths, but this step is not part of the invention. A hydrochloric acid solution of a concentration of 2.5 N, for instance, has been found proper for this purpose; it removes the rare earths into a "strip solution," but not any trivalent chromium that might have been extracted into the solvent. The hydrochloric acid strip solution can then be contacted with undiluted tributyl phosphate for extraction of the zinc present in the aqueous solution away from the rare earths.

Likewise, the europium can be back-extracted from the aqueous solution. For this purpose the solution is first contacted with air whereby the europium is reconverted to the solvent-extractable trivalent state. Thereafter the aqueous solution is extracted with one of the acidic phosphoric or phosphonic acid esters of this invention which take up the trivalent europium but leave any oxidation products of chromium in the aqueous solution.

In the following, a few examples are given to illustrate the process of this invention.

EXAMPLE I

Four runs were carried out to determine the distribution coefficients (organic:aqueous) for divalent europium and americium 241 simultaneously present in an aqueous solution. For europium a mixture of the isotopes $Eu^{152}$ and $Eu^{154}$ was used, the concentration of which can be determined by beta-counting; the americium 241 is an alpha-emitter. Runs 1 and 2 were extractions from an aqueous into an organic solution, while runs 3 and 4 were back-extraction experiments from an organic into an aqueous solution.

In all instances the organic solution was a 0.40 F solution of 2-ethyl hexyl hydrogen phenyl phosphonic acid in toluene, and the aqueous solution was a 0.05 M hydrochloric acid solution which contained chromic chloride in a concentration of 0.001 M. Zinc amalgam containing 0.5% of mercury was added to the aqueous phase in all instances in a quantity of 1 gram per 2 ml. of solution. Both the aqueous and the organic solutions were flushed prior to contacting with nitrogen of 99.95% purity to remove the oxygen. The aqueous and organic solutions were contacted by shaking at about 23° C. and thereafter allowed to settle for about five minutes. After contact, the phases were separated from each other and the distribution coefficients (K) were determined by counting. The distribution coefficients obtained in the four runs are compiled in Table I.

*Table I*

| Run | Conc. in Feed Solution, M | | $K_{Am(III)}$ | $K_{Eu(II)}$ |
|---|---|---|---|---|
| | Am | Eu | | |
| 1 | $10^{-7}$ | $\sim 10^{-7}$ | $1 \times 10^2$ | $2.6 \times 10^{-3}$ |
| 2 | $10^{-7}$ | $10^{-4}$ | $1 \times 10^2$ | $2.0 \times 10^{-3}$ |
| 3 | $10^{-7}$ | $\sim 10^{-7}$ | $1 \times 10^2$ | $3.0 \times 10^{-3}$ |
| 4 | $10^{-7}$ | $10^{-4}$ | $1 \times 10^2$ | $2.0 \times 10^{-3}$ |

The four distribution coefficients obtained for europium (II) were averaged and from the average value $(2.4 \times 10^{-3})$ the separation factors (distribution coefficient of americium:distribution coefficient of divalent europium) were calculated; the result was a separation factor of $4.2 \times 10^4$. This indicates a very effective separation process.

Analogously, the separation factors of divalent europium from promethium, from trivalent europium and from gadolinium were also determined. Separation factors of $9.6 \times 10^4$ for Pm (III)/Eu (II), of $7.5 \times 10^5$ for Eu(III)/Eu (II) and of $1.5 \times 10^6$ for Gd (III)/Eu (II) were obtained.

Example II illustrates a series of extraction and back-extraction steps for the separation of europium from promethium.

EXAMPLE II

Two milliliters of an organic feed solution 0.40 F in 2-ethyl hexyl hydrogen phenyl phosphonic acid in toluene and containing promethium corresponding to a total of $2.3 \times 10^6$ c./m. and europium corresponding to $1.8 \times 10^6$ c./m. were contacted with 2 ml. of an aqueous solution 0.05 M in hydrochloric acid and 0.01 M in chromic chloride. Both aqueous and organic solutions had been pretreated with high-purity nitrogen, and 1 gram of zinc amalgam (0.5% mercury) had been added to the aqueous solution. In each extraction to be described below, an equilibration time of 5 minutes was allowed prior to phase separation.

Contacting of the organic feed solution with the hydrochloric acid solution was intensified by shaking the container; a solvent raffinate was obtained that still contained $2.3 \times 10^6$ c./m. of promethium, but only $1.2 \times 10^4$ c./m. of europium. The aqueous strip solution contained about $2.8 \times 10^4$ c./m. of promethium and $1.8 \times 10^6$ c./m. of europium.

The organic raffinate was again contacted with another 2 ml. of stripping solution whereby a further separation was accomplished. After phase separation the organic raffinate had a europium content of $3.0 \times 10^2$ c./m. and a promethium content of $2.2 \times 10^6$ c./m.; the second aqueous strip solution had a promethium content of $4.8 \times 10^3$ c./m. and a europium content of $9.7 \times 10^3$ c./m.

The aqueous strip solution obtained in the first extraction step was extracted by contacting it with 2 ml. of a 0.40 F solution of 2-ethyl hexyl hydrogen phenyl phosphonic acid in toluene. The solvent extract phase obtained in this extraction step contained $2.7 \times 10^4$ c./m. of promethium and $2.2 \times 10^3$ c./m. of europium. The aqueous phase contained less than $10^3$ c./m. of promethium and $1.7 \times 10^6$ c./m. of europium. These three extraction steps resulted in decontamination factors of $6 \times 10^3$ for promethium with respect to europium contaminant and of more than $2 \times 10^3$ for europium with respect to the promethium contaminant. The yield for both promethium and europium was 96%.

Example III was carried out with a solution containing $Pm^{147}$, $Eu^{152}$ and $Eu^{154}$. The prime purpose of this experiment was to obtain a high-purity practically europium-free promethium.

EXAMPLE III

Two milliliters of an organic feed solution were used; the solvent was a 0.40 F mixture of 2-ethyl hexyl hydrogen phenyl phosphonic acid in toluene. It contained promethium in a total amount of $2.8 \times 10^6$ c./m. and europium in a total concentration of $4.2 \times 10^6$ c./m. An aqueous stripping solution was 0.05 M in hydrochloric acid, 0.01 M in chromic chloride and also contained 1 gram of zinc amalgam having a mercury content of 0.5% by weight. Both solutions were freed from oxygen, as in the previous examples, with nitrogen of a high degree of purity. The organic feed was stripped three times, each time with equal volumes of the aqueous solution. A settling time of about 5 minutes was always allowed for phase separation. Since in this experiment the europium was of no interest, the three strip solutions were discarded; however, the first strip solution was analyzed before disposal. It contained $3.1 \times 10^4$ c./m. of promethium and $2.2 \times 10^6$ c./m. of europium.

The organic raffinate after the first back-extraction step contained $2.8 \times 10^6$ c./m. of promethium and $2.2 \times 10^4$ c./m. of europium; after the second step $2.8 \times 10^6$ c./m. of promethium, but only $2.8 \times 10^2$ c./m. of europium; and after the third stripping step $2.7 \times 10^6$ c./m. of promethium and less than $2.7 \times 10^2$ c./m. of europium. The promethium yield was again 96%, and the decontamination factor $$\left( \frac{\text{Amount of Eu in organic feed}}{\text{Amount of Pm in feed}} \times \frac{\text{amount of Pm in raffinate}}{\text{amount of Eu in raffinate}} \right)$$

for the promethium from the europium was above $1.6 \times 10^4$.

The purification of europium from a number of other rare earths is illustrated in Example IV.

EXAMPLE IV

An organic solution of rare earths was used containing, in a 1.6 F solution of di(2-ethyl hexyl) orthophosphoric acid in toluene, a mixture of trivalent rare earths in a total concentration of 0.1 M, including trivalent europium in a concentration of $10^{-4}$ M; this solution had been obtained in a previous extraction step in which the various rare earths could not be separated from each other quantitatively. The distribution of the various rare earths in this organic feed solution was as follows: lanthanum 1.0% by weight of total rare earths, cerium 1.0%, praseodymium 0.4%, neodymium 2.0%, samarium 30.8%, europium 0.1%, gadolinium 38.4%, terbium 3.9%, dysprosium 9.6%, holmium 0.1%, erbium 0.3% and yttrium 12.5%.

The concentration of 1.6 F of di(2-ethyl hexyl) orthophosphoric acid in toluene corresponded to a concentration of free ester of 1 F, because the other 0.6 F of the total content was necessary to complex the 0.1 M lanthanide rare earths. The aqueous stripping solution used was 0.04 M in hydrochloric acid and 0.01 M in chromic chloride.

Six milliliters of the organic solution were contacted with 2 ml. of the aqueous stripping solution, both after nitrogen treatment, in the presence of 1 gram of zinc amalgam (0.5% Hg); an equilibration time of 15 minutes was allowed before each phase separation. All aqueous solutions were analyzed spectrographically.

After the extraction of the 6 ml. of organic feed with the 2 ml. of aqueous solution, a solvent raffinate was obtained which was 0.1 M in total lanthanides, but contained only trace amounts of europium. This raffinate was discarded. The aqueous solution was extracted with 2 ml. of a 1 F solution of di(2-ethyl hexyl) orthophosphoric acid in toluene. The organic extract phase obtained was also discarded. The aqueous product solution was analyzed and found to contain europium in a concentration of $3 \times 10^{-4}$ c./m., which amounted to a recovery of 95%. Of the total rare earths present in the aqueous product solution the europium content was 93.6%; lanthanum was present in a quantity of 1.8%, cerium of 1.5%, neodymium of 1.0%, samarium of 1.5% and gadolinium of 0.6%. Praseodymium, terbium, dysprosium, holmium, erbium and yttrium were present in concentrations below the limits of detectability. The decontamination factor accomplished for europium with respect to samarium contaminant was $2 \times 10^4$ and that of europium as to gadolinium contaminant was $3 \times 10^4$.

The process of this invention is particularly valuable for the separation of europium from samarium, because these two lanthanides cannot be separated efficiently by conventional methods. The method of this invention lends itself also to the separation of divalent europium from curium and californium present in their trivalent state.

It will be understood that this invention is not to be limited to the details given herein but that it may be modified within the scope of the appended claims.

What is claimed is:

1. A process of separating europium values from other lanthanide rare earth metal values present together in an aqueous mineral-acid-containing feed solution, said mineral acid being selected from the group consisting of hydrochloric acid and sulfuric acid, comprising adding a chromium (III) salt and zinc amalgam to said feed solution; flushing said aqueous solution with nitrogen; contacting said solution with an organic solution of an acidic ester selected from the group consisting of phosphoric acid esters and phosphonic acid esters after it has been flushed with nitrogen; and separating an organic trivalent-rare-earth-containing phase from an aqueous europium-containing phase.

2. The process of claim 1 wherein said chromium (III) salt is chromic chloride.

3. The process of claim 2 wherein said chromic chloride is added in a quantity to yield a concentration in the aqueous solution of between 0.001 and 0.01 M.

4. The process of claim 1 wherein the aqueous and organic solutions are contacted at about 25° C.

5. The process of claim 1 wherein zinc is added in a quantity to form more divalent chromium than is stoichiometrically required for the reduction of all of the europium present.

6. The process of claim 1 wherein the zinc amalgam contains about 0.5% by weight of mercury.

7. The process of claim 1 wherein the aqueous acid solution is a hydrochloric acid solution.

8. The process of claim 1 wherein the aqueous acid solution is a sulfuric acid solution.

9. The process of claim 1 wherein the acidic ester is added in the form of a solution in an aromatic water-immiscible hydrocarbon.

10. The process of claim 9 wherein said hydrocarbon is toluene.

11. The process of claim 10 wherein the ester is present in the toluene in a concentration ranging from 0.01 to 1.5 F.

12. The process of claim 1 wherein said acidic ester is di(2-ethyl hexyl) orthophosphoric acid.

13. The process of claim 1 wherein said acidic ester is 2-ethyl hexyl hydrogen phenyl phosphonic acid.

14. The process of claim 1 wherein said acidic ester is n-octyl hydrogen chloromethyl phosphonic acid.

15. The process of claim 1 wherein both organic and aqueous solutions prior to contact are flushed with an inert gas to remove all oxygen, and the contact is carried out in an atmosphere of said inert gas.

16. The process of claim 15 wherein the inert gas is nitrogen.

17. The process of claim 1 wherein the aqueous europium-containing phase is contacted with oxygen whereby the europium is reconverted to the trivalent state; the solution is then contacted with an acidic ester selected from the group consisting of phosphoric acid esters and phosphonic acid esters, whereby an organic phase containing said europium values and an aqueous raffinate containing chromium values are obtained; and separating said organic phase from said aqueous raffinate.

18. A process of separating europium values from other lanthanide rare earth metal values contained together in an aqueous hydrochloric acid feed solution, comprising adding zinc amalgam to said feed solution; adding chromic chloride to said solution in a quantity to yield a concentration of between 0.001 and 0.01 M; flushing said feed solution with nitrogen gas; preparing an organic solution of an acidic ester selected from the group consisting of phosphoric acid esters and phosphonic acid esters in toluene, the concentration of said acidic ester in the toluene ranging between 0.01 and 1.5 F; flushing said ester solution with nitrogen to remove all oxygen; contacting said aqueous solution with said organic solution while the nitrogen atmosphere is maintained, whereby an organic trivalent-lanthanide-rare-earth-containing phase and an aqueous europium-containing phase are obtained; and separating said organic from said aqueous phase.

19. A process of separating europium values from other lanthanide values present together in an organic solution selected from the group consisting of phosphoric acid ester solution and phosphonic acid ester solution, comprising flushing said solution with nitrogen; contacting said solution with an aqueous mineral acid solution containing chromium (III) salt and zinc amalgam, after it has been flushed with nitrogen, said mineral acid being selected from the group consisting of hydrochloric acid and sulfuric acid; and separating an organic trivalent-rare-earth-containing phase from an aqueous europium-containing phase.

20. A process of separating europium from other lanthanide rare earth metal values present together in an organic solution of an acidic ester selected from the group consisting of phosphoric acid esters and phosphonic acid esters in toluene, comprising adding zinc amalgam to said ester solution; passing a current of nitrogen through said ester solution whereby oxygen is removed; providing an aqueous hydrochloric acid solution of chromic chloride in which the concentration of the chromic chloride ranges between 0.001 and 0.01 M; passing nitrogen gas through said aqueous solution; contacting said aqueous solution with said organic ester solution whereby an aqueous europium-containing product solution and an organic trivalent-lanthanide-rare-earth-containing raffinate are obtained, and separating said product solution from said organic raffinate.

References Cited in the file of this patent

UNITED STATES PATENTS

| | | |
|---|---|---|
| 2,859,092 | Bailes et al. | Nov. 4, 1958 |
| 2,955,913 | Peppard | Oct. 11, 1960 |

OTHER REFERENCES

Krumholz: "2nd U.N. Conference on Peaceful Uses of Atomic Energy," vol. 28, pp. 193–195, September 1958.